(12) United States Patent
Whittenberger

(10) Patent No.: US 7,320,778 B2
(45) Date of Patent: Jan. 22, 2008

(54) HIGH-PERFORMANCE CATALYST SUPPORT

(75) Inventor: William A. Whittenberger, Leavittsburg, OH (US)

(73) Assignee: Catacel Corp., Garrettsville, OH (US)

( * ) Notice: Subject to any disclaimer, the term of this patent is extended or adjusted under 35 U.S.C. 154(b) by 550 days.

(21) Appl. No.: 10/896,302

(22) Filed: Jul. 21, 2004

(65) Prior Publication Data

US 2006/0019827 A1 Jan. 26, 2006

(51) Int. Cl.
*B01D 50/00* (2006.01)
*B01D 53/34* (2006.01)

(52) U.S. Cl. .................. 422/177; 422/180; 422/181
(58) Field of Classification Search ........ 422/177–182, 422/311; 428/116, 188, 593; 502/527, 439
See application file for complete search history.

(56) References Cited

U.S. PATENT DOCUMENTS

| | | | |
|---|---|---|---|
| 3,992,330 A * | 11/1976 | Noakes et al. .............. | 502/336 |
| 4,162,290 A | 7/1979 | Crawford | |
| 4,200,441 A * | 4/1980 | Brown et al. ................. | 96/125 |
| 4,400,309 A | 8/1983 | McMahon | |
| 4,713,234 A | 12/1987 | Weirich | |
| 4,830,834 A | 5/1989 | Stahl | |
| 4,832,998 A | 5/1989 | Cyron | |
| 4,844,837 A | 7/1989 | Heck et al. | |
| 4,863,895 A * | 9/1989 | Behr .......................... | 502/439 |
| 4,923,109 A | 5/1990 | Cyron | |
| 5,004,592 A | 4/1991 | Pinto | |
| 5,039,510 A | 8/1991 | Pinto | |
| 5,070,694 A * | 12/1991 | Whittenberger .............. | 60/300 |
| 5,105,539 A | 4/1992 | Maus | |
| 5,135,794 A | 8/1992 | Maus | |
| 5,139,844 A | 8/1992 | Maus | |
| 5,300,275 A | 4/1994 | Lywood | |
| 5,342,588 A | 8/1994 | Humpolik | |
| 5,384,099 A * | 1/1995 | Sheller ....................... | 422/174 |
| 5,554,342 A * | 9/1996 | Hirayama et al. .......... | 422/174 |
| 5,582,803 A * | 12/1996 | Yoshizaki et al. .......... | 422/174 |
| 5,618,498 A * | 4/1997 | Konya et al. ............... | 422/174 |
| 5,791,044 A * | 8/1998 | Whittenberger et al. ...... | 29/890 |
| 5,851,495 A * | 12/1998 | Yoshizaki et al. .......... | 422/174 |
| 5,866,230 A * | 2/1999 | Maus ......................... | 428/116 |
| 5,925,328 A | 7/1999 | Stahl | |

(Continued)

FOREIGN PATENT DOCUMENTS

WO    WO 00/05168 A1    2/2000

*Primary Examiner*—Glenn Caldarola
*Assistant Examiner*—Frank C Campanell
(74) *Attorney, Agent, or Firm*—Pearne & Gordon LLP

(57) ABSTRACT

A catalyst support is formed of a monolith having corrugated metal leaves. The corrugations of each leaf are oblique relative to the edges of the leaf. Each leaf extends from an interior region to an exterior region, and has corrugations that are non-parallel to the corrugations in an adjacent leaf. Each leaf also includes slits, and is coated with a suitable catalyst. A set of monoliths, made as described above, are stacked within a cylindrical pipe. The corrugations define gas flow channels, which enable heat applied to the exterior of the pipe to travel to the center of the monolith, and back to the outside. The support of the present invention thus facilitates heat transfer to essentially all regions of the monolith. The invention also inherently overcomes the problem associated with thermal mismatch between the metal pipe and a ceramic catalyst material.

16 Claims, 4 Drawing Sheets

U.S. PATENT DOCUMENTS

| | | |
|---|---|---|
| 5,932,141 A | 8/1999 | Rostrop-Nielsen |
| 6,077,459 A | 6/2000 | Laursen |
| 6,274,113 B1 | 8/2001 | Heyse |
| 6,319,877 B1 | 11/2001 | Christensen |
| 6,482,375 B1 | 11/2002 | van der Wal |
| 6,576,158 B1 | 6/2003 | Christensen |
| 6,746,624 B1 | 6/2004 | Christensen |
| 7,090,487 B2 * | 8/2006 | Whittenberger ............. 431/268 |
| 7,179,313 B2 * | 2/2007 | Retallick et al. ................ 48/75 |
| 2002/0128151 A1* | 9/2002 | Galligan et al. ............ 502/302 |
| 2003/0012973 A1* | 1/2003 | Sato et al. .................. 428/593 |

* cited by examiner

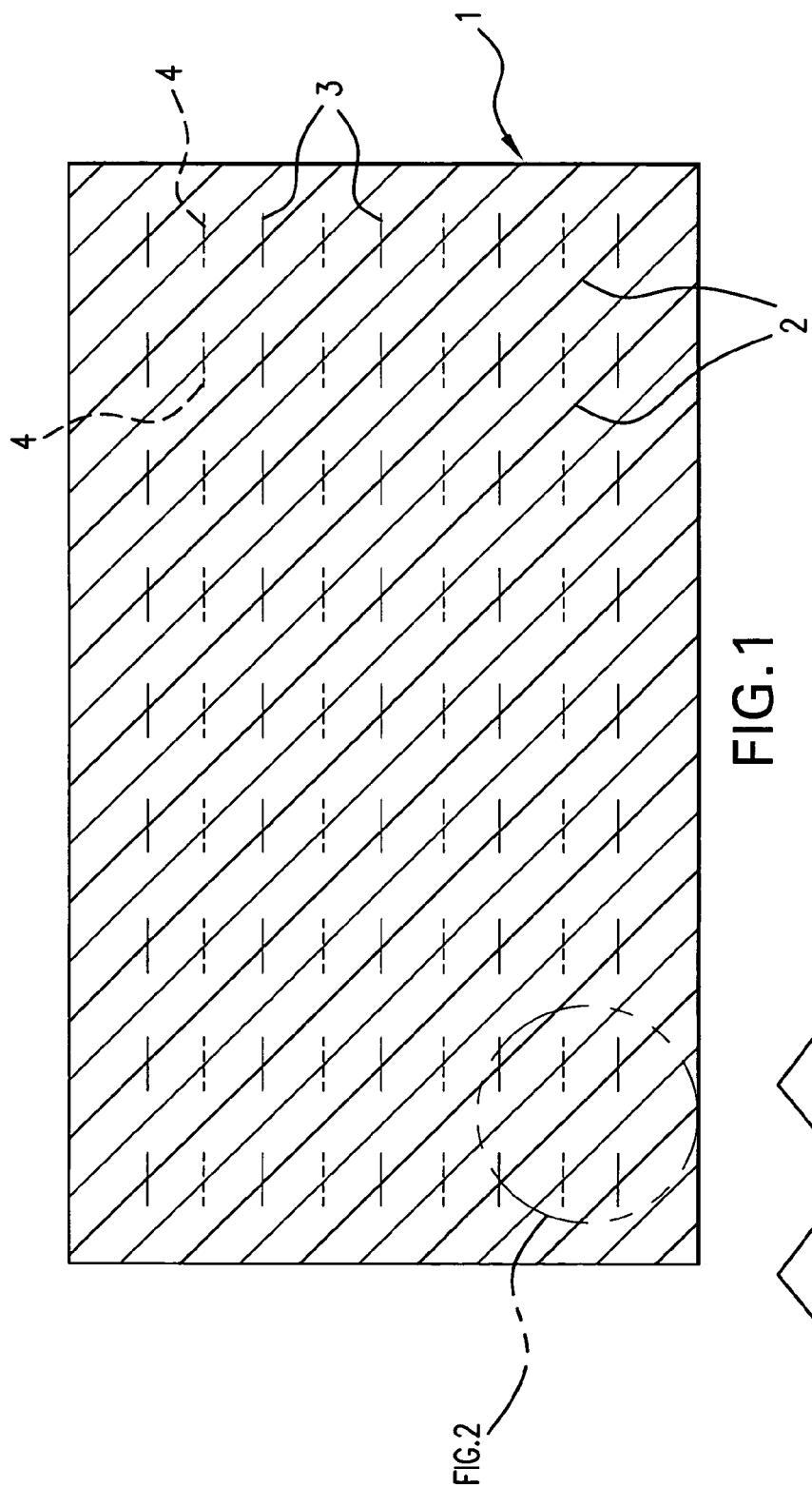
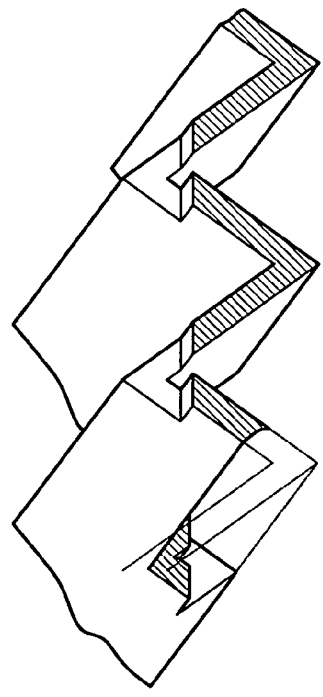
FIG.1
FIG.2

HIGH-PERFORMANCE CATALYST SUPPORT

BACKGROUND OF THE INVENTION

This invention relates to the field of catalytic fuel reforming, and provides a catalyst support capable of operation at high temperatures, such as are encountered in a steam reforming process.

A fuel cell produces an electric current using hydrogen as a starting material. The hydrogen required by a fuel cell is typically made by a steam reforming process, in which a hydrocarbon fuel is reacted with water, the water being in the form of steam. The steam reforming reaction is endothermic, and therefore requires a source of heat.

Other industrial processes, such as oil and gas refining, ammonia and fertilizer production, hydrogenation of oils and chemicals, and iron ore reduction, also use hydrogen as a beginning or intermediate part of the process. Most of these processes also use steam reforming of hydrocarbon fuel, usually natural gas, to make the hydrogen.

In the prior art, it has been known to use shaped ceramic catalysts in packed beds to support the steam reforming reaction. These packed beds are typically arranged in tubes that are about 4-6 inches in diameter, and up to about 40 feet tall. Many such tubes are arranged in a furnace to supply heat for the reforming reaction. A typical furnace temperature is about 850° C. Steam and natural gas enter the top of the tubes. A catalytic reaction takes place through the vertical packed bed, producing hydrogen, among other products such as carbon monoxide and carbon dioxide, which exit from the bottom of the tube.

The above-described packed-bed system has two major disadvantages. First, heat transfer from the tube wall into the packed bed is a limiting factor. While heat can be quickly transferred, by conduction, through the metal tube wall, it is difficult to transfer heat through the packed media so as to reach the media near the center of the tube. Consequently, most of the system performance comes from the packing near the walls, and the packing near the center is only marginally effective.

Secondly, the thermal expansion mismatch between metal and ceramic limits the durability of the system. On furnace startup, the tubes expand, but the ceramic packing does not. As the tube expands, the ceramic settles to fill the void created. When the furnace is later shut down, the tube contracts and crushes the settled ceramic media, forming a powder. Several heating and cooling cycles can produce enough cracked material to block the reactor, at least partially. Consequently, the media must be changed, typically every 5-7 years. Changing the packed media is an expensive process, and requires that the reactor be shut down for a period of time.

The present invention solves the above-described problems, by providing a catalyst support that more effectively moves heat from the outer wall of a metal tube to the center region of the tube, and back. The catalyst support of the present invention also avoids the thermal mismatch problem that plagues packed-bed catalyst systems, and thus avoids the crushing of ceramic material that leads to eventual replacement of the media. The support made according to the present invention can be expected to last for the life of the plant.

SUMMARY OF THE INVENTION

In one embodiment, the present invention comprises a catalyst support formed of a monolith made from a plurality of pieces of corrugated metal. The corrugations in each piece are oblique relative to the edges of the piece. In one preferred embodiment, where the pieces are square or approximately square, the corrugations make an angle of about 45° relative to the edges. The pieces have slits formed in at least some of the corrugations. These pieces are coated with an appropriate catalyst.

The above-described pieces of corrugated metal comprise a plurality of leaves that define the monolith. Each leaf is arranged to define a curve, preferably having the form of a truncated spiral. Each leaf extends from an interior region to an exterior region of the monolith. In one preferred embodiment, the leaves are attached, such as by welding, to a central cylindrical shoe, located near the interior region. Adjacent leaves are oriented such that their corrugations are non-parallel to each other, so that adjacent leaves do not nest together. The monolith may be temporarily or permanently enclosed by a band or wire.

The catalyst support of the present invention includes a plurality of monoliths, each having the structure described above, the monoliths being contained within a long, cylindrical pipe. The corrugations define gas flow channels, and the orientation of these channels assures that gas will flow from the outside of the monolith towards the inside, and back to the outside, and so on. In this way, heat is effectively transferred from the outside of the tube or pipe to its interior.

The invention also includes a method of making the monolith described above. The monolith can be made by forming a plurality of corrugated pieces of metal, each piece having corrugations that are oblique to the edges of the piece. Each such piece also has slits formed in the corrugations. Each piece is then attached, such as by welding, to a shoe, which initially comprises a flat piece of metal. The pieces are attached such that the corrugations of adjacent pieces are non-parallel to each other. The shoe is wound upon itself to define a central cylinder, and the pieces are curved to form truncated spirals that terminate at an exterior region. A band or wire can be used to enclose the pieces, which now define a plurality of leaves. The resulting structure comprises the monolith. A plurality of such monoliths can then be stacked in a tube or pipe, as described above.

The invention therefore has the primary object of providing a catalyst support which is suitable for use in high-temperature environments.

The invention has a further object of providing a high-temperature catalyst support which facilitates the flow of heat from outside the support to the interior of the support.

The invention has the further object of reducing or eliminating the problem associated with thermal mismatch between a metal pipe and a ceramic catalyst material.

The invention has the further object of prolonging the useful life of a catalytic reformer or heat exchanger.

The invention has the further object of improving the efficiency, and/or reducing the cost, of a steam reforming process.

The invention has the further object of providing an improved means of making hydrogen for a fuel cell, or other hydrogen-using process, by providing an improved catalyst support for use in a steam reforming process.

The invention has the further object of providing a method of making a catalyst support having the purposes and functions described above.

The reader skilled in the art will recognize other objects and advantages of the present invention, from the following brief description of the drawings, the detailed description of the invention, and the appended claims.

BRIEF DESCRIPTION OF THE DRAWINGS

FIG. 1 provides a plan view of one of the corrugated strips used to build the catalyst support of the present invention.

FIG. 2 provides a detailed, fragmentary, perspective view, showing the shape of the corrugations, and the slits formed, in the strips used to make the catalyst support of the present invention.

DETAILED DESCRIPTION OF THE INVENTION

The catalyst support of the present invention is assembled from a plurality of corrugated strips of metal foil, a typical strip 1 being illustrated in FIG. 1. The foil has corrugations 2 which are oblique with respect to the longitudinal and transverse edges of the strip. In a preferred embodiment, wherein the pieces of foil are generally square or rectangular, the corrugations may form an angle of approximately 45 degrees with respect to the edges. But the exact angle is not critical, as virtually any oblique orientation of the corrugations can be used in the present invention.

The strip also has a plurality of slits 3 formed in the top side of the foil, i.e. the side facing the reader, and a plurality of slits 4 formed in the bottom side, the slits 3 and 4 alternating with each other as shown. The slits are cut into the apex or crown of the corrugations, and preferably extend to a depth of approximately one-third of the total height of the corrugation. For example, if the height of the corrugation is about 0.15 inches, the depth of the slit could be about 0.05 inches. The slits may be approximately one quarter of an inch apart. All of the latter numerical values are given as examples only, and should not be construed to limit the invention.

Figure 3:
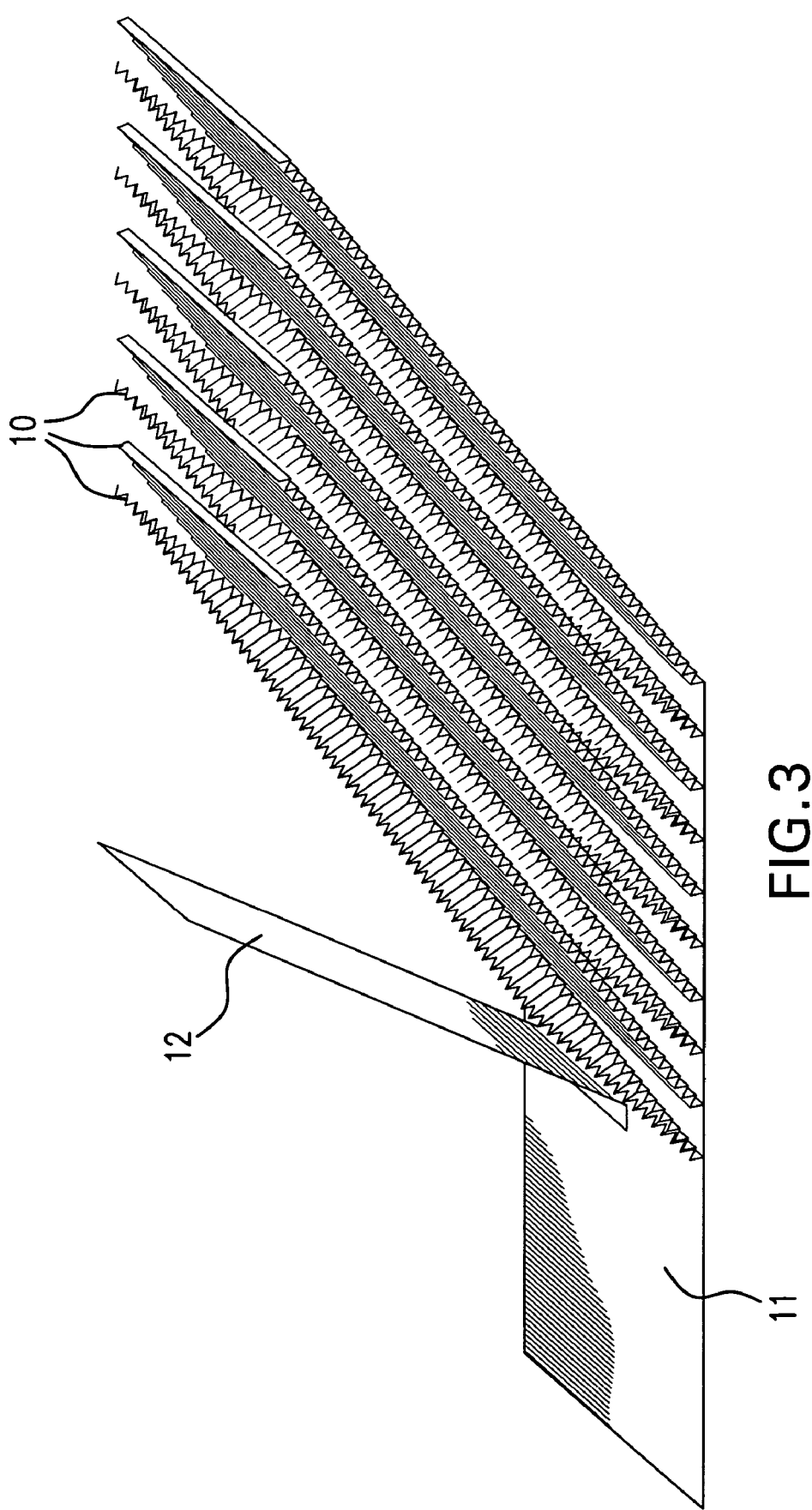
FIG. 3 provides a perspective view of an assembly of perforated, corrugated strips that together form the catalyst support of the present invention.

The next step in the assembly of the catalyst support is illustrated by FIG. 3. A plurality of leaves 10, each comprising a corrugated foil strip having slits in the corrugations, formed as described above and as illustrated in FIGS. 1 and 2, and each having been coated on both sides with an appropriate catalyst, are attached to shoe 11. The shoe is also preferably made of metal foil, and initially comprises a generally rectangular piece, as shown. The leaves 10 are preferably attached to the shoe by welding, and are attached at uniform intervals along the shoe.

In the assembly shown in FIG. 3, every other leaf 10 has been flipped, so that the leaves will stack. Thus, adjacent leaves have corrugations that are non-parallel to each other, such that adjacent leaves will not nest together.

One then prepares a relatively narrow wrap foil 12, which is attached to the shoe foil, again preferably by welding. The wrap foil may be attached to the shoe at or near the center of the shoe, and near the position where the last leaf 10 was welded.

Figure 4:
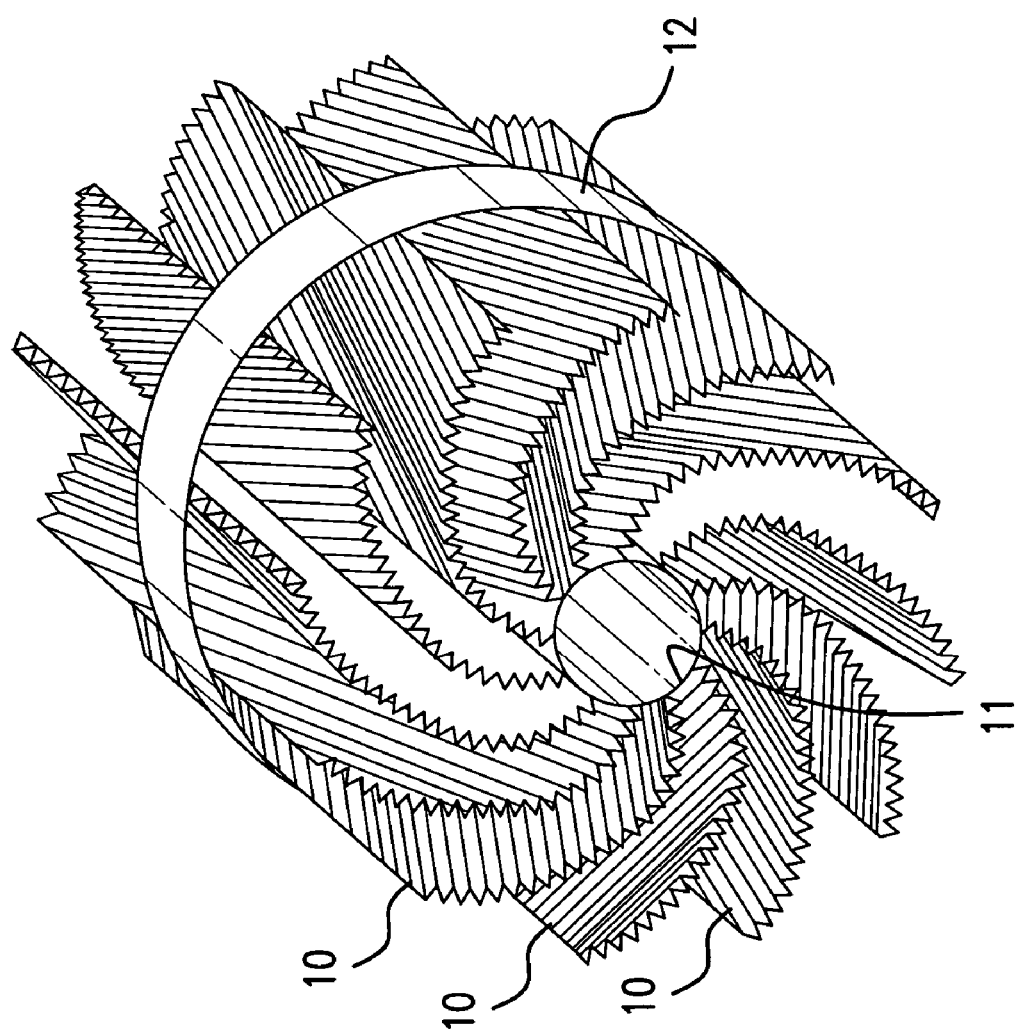
FIG. 4 provides a perspective view of the catalyst support of the present invention, made from the assembly of FIG. 1.

The shoe foil 11 is then wound around a generally cylindrical pipe or mandrel (not shown), while the leaves 10 are curved in a generally truncated spiral shape. The wrap foil 12 is pulled around the leaves to enclose them, and thus to form the monolith shown in FIG. 4. In FIG. 4, the center pipe or mandrel, upon which the shoe foil 11 was wound, has been removed. The wrap foil 12 is welded to itself so as to define a band which holds the monolith together. Also, the shoe foil 11 is welded to itself such that it defines a generally cylindrical structure at the center of the monolith.

For clarity of illustration, FIG. 4 shows a lower density of leaves, i.e. a smaller number of leaves per unit length of the shoe, than would be used in practice. In the preferred embodiment, there will be more leaves than are shown in FIG. 4. To enable the corrugations to define channels for gas flow, each leaf must contact both of its neighbors. The leaves thus occupy most of the available volume defined by the monolith.

Instead of a flat band, one could use a wire, or other retaining means, to perform the function of the wrap foil. Ultimately, the entire unit is enclosed within an outer tube (not shown in FIG. 4).

The shoe foil is a convenient aid to construction, but is not essential to the present invention. The monolith can be assembled in other ways, and without even using a shoe foil.

For example, one could shape each leaf into the proper curvature, and stack the leaves together around a central hole, or an arbor that represents a hole. Then, the assembly can be tied together with a band or wire. The result is a monolith whose volume is substantially occupied by the leaves, but having a hole in the middle. The hole could then be filled with an appropriate object, such as a capped-off tube.

Also, attaching the wrap foil to a shoe foil is convenient, but not essential to the present invention. The catalyst support could also be made without affixing the wrap foil to the shoe foil at all.

Figure 5:
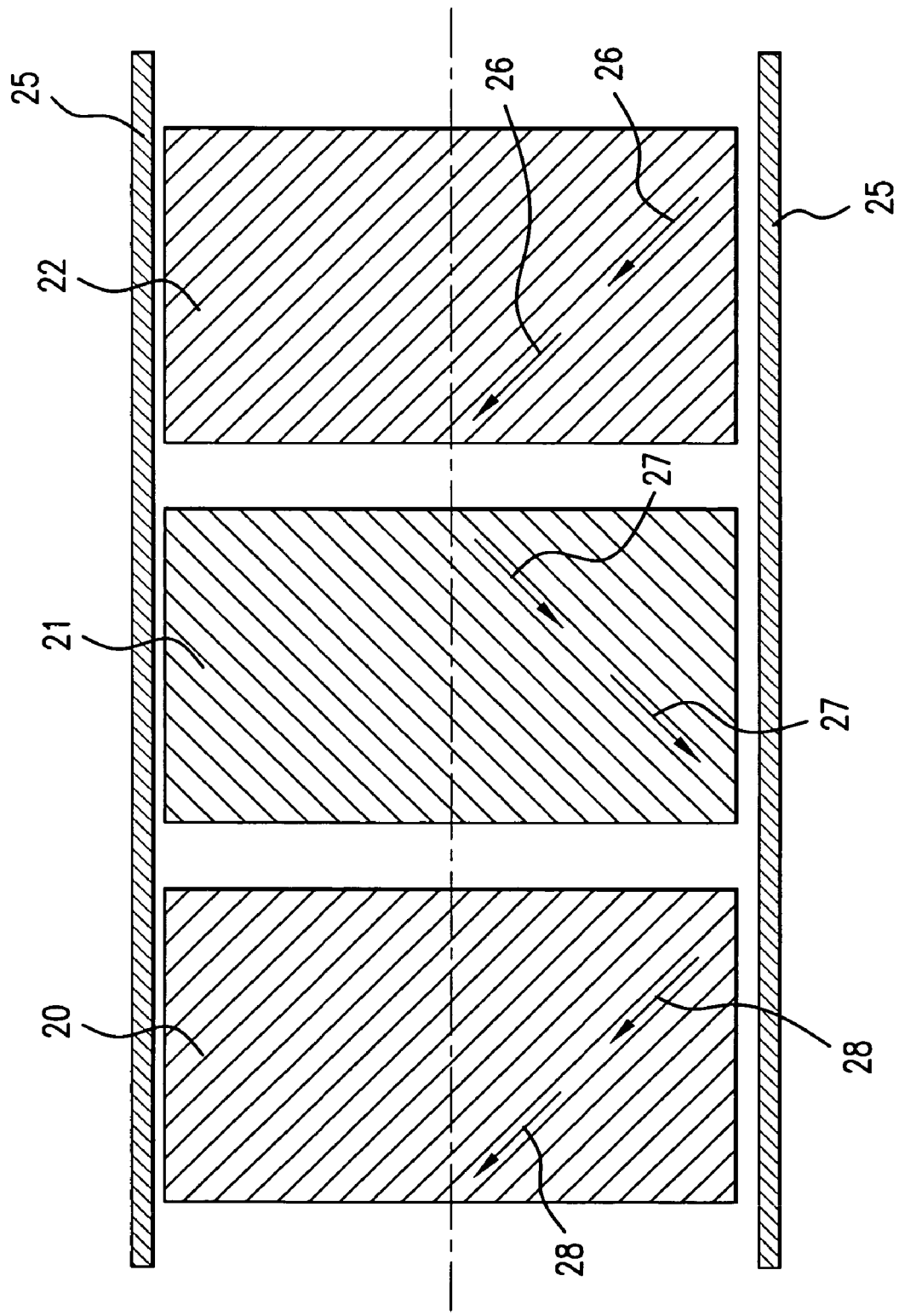
FIG. 5 provides a schematic diagram illustrating the transfer of heat from the exterior to the interior of the catalyst support of the present invention.

FIG. 5 is a schematic diagram illustrating a plurality of stacked monoliths, each made as shown in FIGS. 1-4. FIG. 5 shows some of the important heat transfer paths in the resulting structure. FIG. 5 represents a stack of three such monoliths, designated by reference numerals 20, 21, and 22; in a practical embodiment, there would usually be many more such monoliths in the stack. The monoliths are held within a generally cylindrical pipe having wall 25.

When the catalyst support is in use, heat is supplied from the outside of the stack, i.e. from the exterior wall 25. The arrows represent typical paths for fluid flow. Due to the oblique nature of the corrugations, fluid flows from the outside of the stack towards the inside, as shown by arrows 26, and then from the inside back towards the outside, as shown by arrows 27, and then towards the center, as shown by arrows 28, and so on.

It is important to note that FIG. 5 should not be interpreted to imply that the monoliths are inserted in the tube with any particular orientation. Indeed, the monoliths could be stacked with random orientations. Because the corrugations are oblique relative to the edges of the pieces, the corrugations define spiral channels in the monoliths. And because every other leaf is reversed relative to its neighbors, there are always channels in the monolith which lead in opposite directions. Thus, regardless of the orientation of a particular monolith, gas flowing within the monolith will always find some channels that lead to the interior and back to the exterior. The gas flow paths illustrated in FIG. 5 are only typical flow paths, and do not represent every possible path defined by every corrugation in the monolith.

It is thus the skewed or oblique arrangement of the corrugations that causes gas near the outside of a given monolith in the stack to acquire heat from the tube wall, and to travel along a skew channel, emerging from the monolith near the center. This gas then re-enters the adjacent monolith in the stack, entering another skew channel, and is redirected to the outside, where it can again acquire heat from the tube wall. The exact path of the gas may vary somewhat from the idealized arrangement illustrated in FIG. 5, but in general, the gas has nowhere to go except along a path that leads from the outside to the inside and back. In this way, heat can be effectively moved from the exterior of the tube to the area near the center of the tube. By contrast, the prior art supports using conventional packed-bed ceramics do not allow heat to move easily to the center, rendering the central zone mostly ineffective.

It should be understood that FIG. 5 is only schematic, and that it is a two-dimensional representation of what actually are three-dimensional fluid flow paths. But even after the flat leaves are wound to form the final product, the center portions will remain in the center, and the outside portions will remain on the outside. Thus, the diagram correctly illustrates the important point that the invention provides a path for fluid flow that leads from the outside to the center, and back to the outside, thereby facilitating the flow of heat from the outside to the inside.

In one preferred embodiment, the supports shown in FIG. 4 may be about 4-6 inches in diameter and about 4-6 inches in axial length. The tube in which a plurality of such supports are axially stacked may be as long as about 40 feet. These values should not be deemed to limit the invention, as the structures could be made with other dimensions and proportions.

The purpose of the slits formed in the foil is to enable the foil to assume a spiral shape (or, more accurately, a truncated spiral shape), as illustrated in FIG. 4. A typical corrugated metal foil, having no slits, will not readily conform to the spiral shape. Just as would happen if one tried to bend a metal rod into a smooth curve, the conventional foil, when bent, would tend to form kinks in unpredictable locations. Forming slits in the foil allows the foil to expand or contract easily, as needed. The foil can then be bent to form the truncated spiral shape, without damage. In effect, the slits selectively and slightly weaken the foil so that it is more easily bent into a smoothly curved structure. To the extent that kinks occur, they comprise a large number of small kinks in controlled locations. By placing the slits on both sides, though relatively offset from each other, the strip can be made to flex easily in either direction. The slits have the added benefit that gas can travel through the slits and provide additional mixing.

The corrugated strips may be conveniently prepared by forming conventional corrugations on a rectangular piece of foil. That is, the initial corrugations may be straight, i.e. parallel to a pair of edges of the piece of foil. The piece of foil is then cut so as to define a new piece, having an approximately square or rectangular shape, and having edges that are oblique relative to the corrugations. In other words, it is possible to prepare the strips by first forming straight corrugations, and then cutting the strips so as to form new edges, and thereby defining skewed or oblique corrugations. The invention is not limited, however, by the particular method used to make the corrugated leaves.

Metal foils, in the prior art, have been used as catalyst supports, as illustrated in U.S. Pat. Nos. 4,832,998, 4,923, 109, 5,105,539, 5,135,794, 5,139,844, and 5,342,588, the disclosures of which are incorporated by reference herein.

The prior art has taught the use of spiral wound foils, and such shapes are known to be durable, practical to manufacture, and effective as catalyst supports in reactions where heat transfer is not a factor. Such catalyst supports made of corrugated foils usually have straight-through cells, or sometimes herringbone-shaped cells, and occasionally shallow-angle (about 15°) skew cells. But such supports of the prior art have not been made with the structure described above, which enables gas conveniently to flow from the outside of a tube to the inside of the tube, and back.

The structure of the catalyst support of the present invention inherently overcomes the problem of thermal mismatch discussed above. Unlike a packed-bed system, in which ceramic catalyst material fills the interior of a cylindrical tube or pipe, the catalyst in the present invention is coated onto the many leaves of metal foil forming the support. Moreover, these pieces are distributed, essentially uniformly, through most of the volume of the monolith. Thus, the catalyst is effectively distributed throughout most of the volume enclosed by the pipe. This arrangement is not likely to form powder due to expansion and contraction of the metal leaves, because there is no single mass of ceramic forming a packed bed. It is also unlikely, using the arrangement of the present invention, that the expansion and contraction of the exterior metal pipe would have any effect on the catalyst.

The invention can be modified in various ways. For example, as noted above, the angle made by the corrugations relative to the edge of the strip may be 45°, or it may be some other value, as long as the corrugations are oblique relative to the edge.

The corrugations in the strip have been illustrated as triangular in cross-section, but other shapes could be used instead. The shape and depth of the slits can also be varied.

Also, instead of using foil, one could obtain the same result by using a screen material, as the wires of the screen would slip relative to one another and allow the structure to assume a spiral shape to form the monolith.

The above and other modifications, which will be apparent to the reader skilled in the art, should be considered within the spirit and scope of the following claims.

What is claimed is:

1. A catalyst support comprising a plurality of monoliths arranged within a generally cylindrical pipe, each of said monoliths having an exterior region, in a vicinity of said pipe, and an interior region, each of said monoliths comprising a plurality of corrugated metal leaves, each leaf being coated with a catalyst effective to catalyze a catalytic reaction, said corrugated leaves defining a plurality of gas flow channels, some channels adapted to lead gas from the exterior region to the interior region and other channels adapted to lead gas from the interior region to the exterior region.

2. The catalyst support of claim 1, wherein each of said monoliths comprises at least three of said leaves.

3. The catalyst support of claim 1, wherein each leaf has a pair of longitudinal edges, and wherein each leaf has corrugations which are oblique relative to said longitudinal edges.

4. The catalyst support of claim 1, wherein each leaf has a plurality of slits.

5. The catalyst support of claim 3, wherein each leaf has a plurality of slits.

6. The catalyst support of claim 1, wherein each leaf extends from a cylindrical shoe in a vicinity of the interior region towards an interior surface of said pipe.

7. The catalyst support of claim 4, wherein each corrugation defines an apex, and wherein the slits penetrate part of the apex.

8. The catalyst support of claim 1, wherein each leaf has a spiral shape terminating in a vicinity of said exterior region.

9. The catalyst support of claim 1 wherein corrugations of adjacent leafs have mutually opposite orientations.

10. A method of making a catalyst support, comprising:
   a) forming corrugations in a plurality of pieces of metal, such that the corrugations are skewed relative to an edge of each piece of metal,
   b) arranging adjacent pieces such that their corrugations are of mutually opposite orientations and attaching said pieces to a generally flat shoe,
   c) bending said shoe upon itself to define a generally cylindrical central member, while bending said pieces such that they curve outwardly from the central member to an exterior region, and
   d) enclosing said pieces in a wrapping means.

11. The method of claim 10, further comprising the step of forming a plurality of slits in each of said pieces.

12. The method of claim 10, further comprising stacking a plurality of catalyst supports, made according to steps (a) through (d), in a generally cylindrical pipe.

13. The catalyst support of claim 1, wherein each of said monoliths comprises at least six of said leaves.

14. The catalyst support of claim 3, wherein said corrugations form an angle of about 45° relative to one of said longitudinal edges.

15. The catalyst support of claim 1, wherein the corrugations of adjacent leaves are non-parallel to each other.

16. The catalyst support of claim 1, wherein the corrugations in one leaf are oriented to lead gas from the exterior region to the interior region and wherein the corrugations in the adjacent leaf are oriented to lead gas from the interior region to the exterior region.

* * * * *